United States Patent [19]
Sekiguchi et al.

[11] Patent Number: 5,893,245
[45] Date of Patent: Apr. 13, 1999

[54] PANEL WITH HOLDING FRAME

[75] Inventors: Takamasa Sekiguchi; Katuyuki Hagihara, both of Tokyo; Hiromitsu Iida, Joetsu; Katsuyuki Maruta, Joetsu; Shoichi Yamada, Joetsu; Yuji Shimizu, Joetsu, all of Japan

[73] Assignee: Mitsubishi Chemical Corporation, Tokyo, Japan

[21] Appl. No.: 08/802,926

[22] Filed: Feb. 20, 1997

[30] Foreign Application Priority Data

Feb. 27, 1996 [JP] Japan ..................... 8-065477
Nov. 18, 1996 [JP] Japan ..................... 8-306338

[51] Int. Cl.$^6$ ..................................... E04C 2/00
[52] U.S. Cl. ............... 52/235; 52/509; 52/512; 52/800.18; 52/597; 52/781.3; 52/656.1; 52/656.9; 52/780; 403/295
[58] Field of Search ............... 52/235, 506.06, 52/509, 510, 512, 800.12, 800.18, 597, 781.3, 475.1, 656.1, 656.9, 657, 508, 770, 771, 780; 403/295, 298, 401

[56] References Cited

U.S. PATENT DOCUMENTS

| | | | |
|---|---|---|---|
| 3,284,113 | 11/1966 | Howell | 52/656.1 X |
| 3,700,385 | 10/1972 | Sherwood | 52/475.1 X |
| 4,040,223 | 8/1977 | Hillstrom | 52/506.06 |
| 4,606,170 | 8/1986 | Mendenhall | 52/800.12 X |
| 4,936,065 | 6/1990 | Hutchinson | 52/235 |
| 5,150,983 | 9/1992 | Bogenhagen | 52/656.9 X |
| 5,157,890 | 10/1992 | Jines | 52/656.9 X |
| 5,263,292 | 11/1993 | Holland et al. | 52/235 |

FOREIGN PATENT DOCUMENTS

4-128452  4/1992  Japan ..................... 52/235

*Primary Examiner*—Carl D. Friedman
*Assistant Examiner*—Laura A. Callo
*Attorney, Agent, or Firm*—Oblon, Spivak, McClelland, Maier & Neustadt, P.C.

[57] ABSTRACT

The present invention provides a panel with holding frames, in which the panel and the holding frames can be fitted easily and at a high accuracy and there is no problem concerning appearances. The panel with holding frames is formed by fitting the holding frame to each side portion of a square panel. Each holding frame has a leg portion for connecting to a fixation portion for fitting, a support portion fixed to a rear surface of the panel in contact, and a rim portion for catching a periphery of the panel, and the support portion has a relief portion operating to receive the periphery of the panel into the rim portion smoothly. The respective holding frames are temporarily assembled in a frame-shape, and receiving portions for fitting corner blocks are formed at the support portions of the holding frames to make the respective holding frames in a predetermined fixation state after putting the panel into the temporarily assembled frame. The receiving portion and the corner block are formed to be rotatable relatively.

15 Claims, 9 Drawing Sheets

PANEL WITH HOLDING FRAME

BACKGROUND OF THE INVENTION

1. Field of the Invention

The present invention relates to a panel with holding frames, more particularly, relates to a panel with holding frames structured by fitting holding frames to respective sides of a square panel.

2. Description of the Related Art

A panel with holding frames is used as a facing panel for an architecture such as a building from points of weight, durability, workability or the like. A conventional panel with holding frames is disclosed in the Japan Patent Application Laid-Open No. 7-102734 in 1995 or the like. The conventional panel with holding frames disclosed in this laid-open publication is provided with a panel formed from a composite material, which aluminum sheets are adhered to each surface of a synthetic resin substrate, in a square plate and holding frames fitted to a peripheral edges to protect the peripheral edge and to cover the sides.

The holding frame included in the conventional panel with holding frames is provided with a leg portion for attaching to an architecture, a support portion abutted and fixed to the rear surface of the panel, and a holding portion for holding the peripheral edge of the panel. The holding frame is fitted to the panel in a manner that the peripheral edge of the panel is put between the support portion and the frame edge of the catching portion.

Now, since a panel which holding frames are fitted, is relatively large such as 1200 mm×2400 mm, there are some torsion and/or warp. Thus, it becomes a very difficult work to fit the holding frames to the periphery of the panel like this, since the holding frames must be fitted while reforming the torsion or the like, the peripheral portion of the panel must be inserted into a very small space (the difference between the thickness of the panel and the interval of the catching portion, which the peripheral portion is inserted, for the holding frame) and there are another difficulties. Therefore, only well-skilled workers can fit holding frames to the panel.

Needless to say, the interval between the support portion of the holding frame, which the peripheral portion of the panel is inserted, and the frame edge of the holding portion may be made large, whereby the difficulties for fitting are slightly improved and the work therefor becomes easy. However, when the interval between the support portion of the holding frame and the frame edge of the holding portion is made large like this, a space is formed between the frame edge and the surface of the panel, therefore, there is a problem in that no good appearances can be obtained.

SUMMARY OF THE INVENTION

Accordingly, it is an object of the present invention to solve the problem about the fitting work of the conventional panel with holding frames and to provide a panel with holding frames, which the holding frame can be fitted to the panel easily and high-accurately and there is no problem concerning appearances.

It is another object of the present invention to provide a panel with holding frames to solve the problem about the fitting work in the conventional panel with holding frames by varying the structure of the holding frame fitted to the panel.

It is further another object of the present invention to provide a panel with holding frames used as an external wall panel for an architecture, which can solve the problem about the fitting work in the conventional panel with holding frames by varying the structure of the holding frame fitted to the panel.

The present invention is a panel with holding frames, and it is structured as follows, so that the above objects are accomplished. That is, the present invention is characterized in that in a panel with holding frames by fitting a holding frame to each side portion of a square panel, each holding frame has a leg portion for connecting to a fixation portion for attaching, a support portion fixed to a rear surface of the panel in contact, and a rim portion for catching a periphery of said panel, and, the support portion has a relief portion operating to receive the periphery of the panel with the rim portion smoothly on a base portion of the rim portion.

In the panel with holding frames with characteristics, it is preferable that each holding frame is formed by integratedly joining one end of the leg portion standing approximately perpendicular to the rear surface of the panel, one end of the rim portion and one end of the support portion extending to a center side along the rear surface of the panel, a joining portion is a base portion of the rim portion, and another end of the leg portion is connected to a fixation portion for attaching.

Further, it is preferable that the described rim portion for catching the periphery of the panel is provided with a wall portion extending from the base portion to a surface of the panel along a side surface of the panel and a engaging claw formed at a head portion of the wall portion and projecting slightly along the surface of the panel, and the engaging claw is hooked to a periphery at a side of the surface of said panel.

Moreover, the relief portion formed at the support portion may be a tilting surface going down to said base portion of the rim portion. In this case, an interval between the base portion to be a lowest position of the tilting surface and the engaging claw is slightly larger than a thickness of the panel.

Furthermore, the rim portion and the relief portion formed at the support portion may be formed continuously through a recess groove formed at said base portion. With this, the excess of the adhesive, which is applied when it is necessary to fit the holding frame to the rear surface of the panel temporarily, can be got away.

Still more, in a panel with holding frames according to the present invention, it is preferable that the support portion is provided with an receiving portion for engaging a corner block to connect adjacent holding frames each other and is formed so as to be rotatable relatively to the corner block.

In that case, the receiving portion may be formed into a groove portion. When the receiving portion is formed into a groove portion, it is particularly preferable that the receiving groove portion is formed in a manner that a section thereof is circular. In addition, it is preferable that the opening portion of the groove portion of which a section is circular is formed in direct opposition to the rear surface of said panel, since the engaging state of the corner block can be confirmed from the rear side of the panel with holding frames.

Further, in the panel with holding frames according to the present invention, when the holding frame is fixed to each side portion of the panel, four holding frames are connected one another and assembled temporarily in a frame with plural corner blocks of which each end portion is inserted into the receiving portion of the adjacent holding frames and a holding frame temporary assembled body is kept in a state that the holding frame temporary assembled body is tilted slightly in a manner that a tilting surface of the relief portion at said support portion becomes a part of a virtual plane in parallel with the rear surface of said panel, the panel is positioned so as to put a peripheral rear surface portion thereof on the tilting surface of the relief portion to provide said panel in the holding frame temporary assembled body in the state, and finally the support portion is rotated toward the rear surface of the panel by pushing the four holding frames to sides of the panel almost at a same time so as to put the peripheral portion of the panel to the rim portion accurately.

Moreover, in the panel with holding frames according to the above described present invention, it is preferable that the support portion is fixed to the panel with a rivet, and a top of the rivet stops at an inside of the panel not to pass through a surface side. In this case, it is preferable that a portion of the support portion to fix to the panel with the rivet is a shelf portion having an interval from the rear surface of said panel. With this arrangement, a top portion of the rivet splits and opens in the panel, and the support portion can be strongly pushed to the panel with a split and opened portion and a rivet head over said shelf portion so as to be fixed to said panel. In this case, the shelf portion is formed at a center side than the receiving portion for engaging the corner block.

Furthermore, the panel with holding frames according to the above described present invention, it is preferable that the panel is a laminated member which thin metal sheets are laminated to both surfaces of a plate member consisting of inorganic material such as ceramic, gypsum, asbestos cement calcium silicate and cement or various synthetic resins, and it is particularly preferable that the panel is formed from synthetic resin material. In addition, it is preferable that the metal sheets included in the panel are formed from one of metal such as aluminum, stainless, iron, copper, titanium, tin and nickel, various kinds of alloy and so on. Still more, it is preferable that the holding frame is formed from one of metal such as aluminum, stainless, iron, copper, titanium, tin and nickel, various kinds of alloy, and so on, which has approximate same electric potential.

Additionally, a panel with holding frames according to the present invention, it is preferable that the panel with holding frames is used as an external wall panel for an architecture. In this case, another end portion of the leg portion included in the holding frame is connected with the fixation portion such as the angle attached to the body of the architecture, whereby the panel with holding frames can be provided.

BRIEF DESCRIPTION OF THE DRAWINGS

Other objects and advantages of the present invention will become apparent during the following discussion conjunction with the accompanying drawings, in which:

FIG. 6 shows a final stage; and, FIG. 10 is a partial section view of a principal portion of a panel with holding frames and illustrates another attaching structure for attaching a panel with holding frames of the present invention to a bed member arranged at a body surface side of an architecture.

DETAILED DESCRIPTION OF THE PREFERRED EMBODIMENTS

Preferred embodiments of the present invention will now be described with reference to the accompanying drawings.

Figure 1:
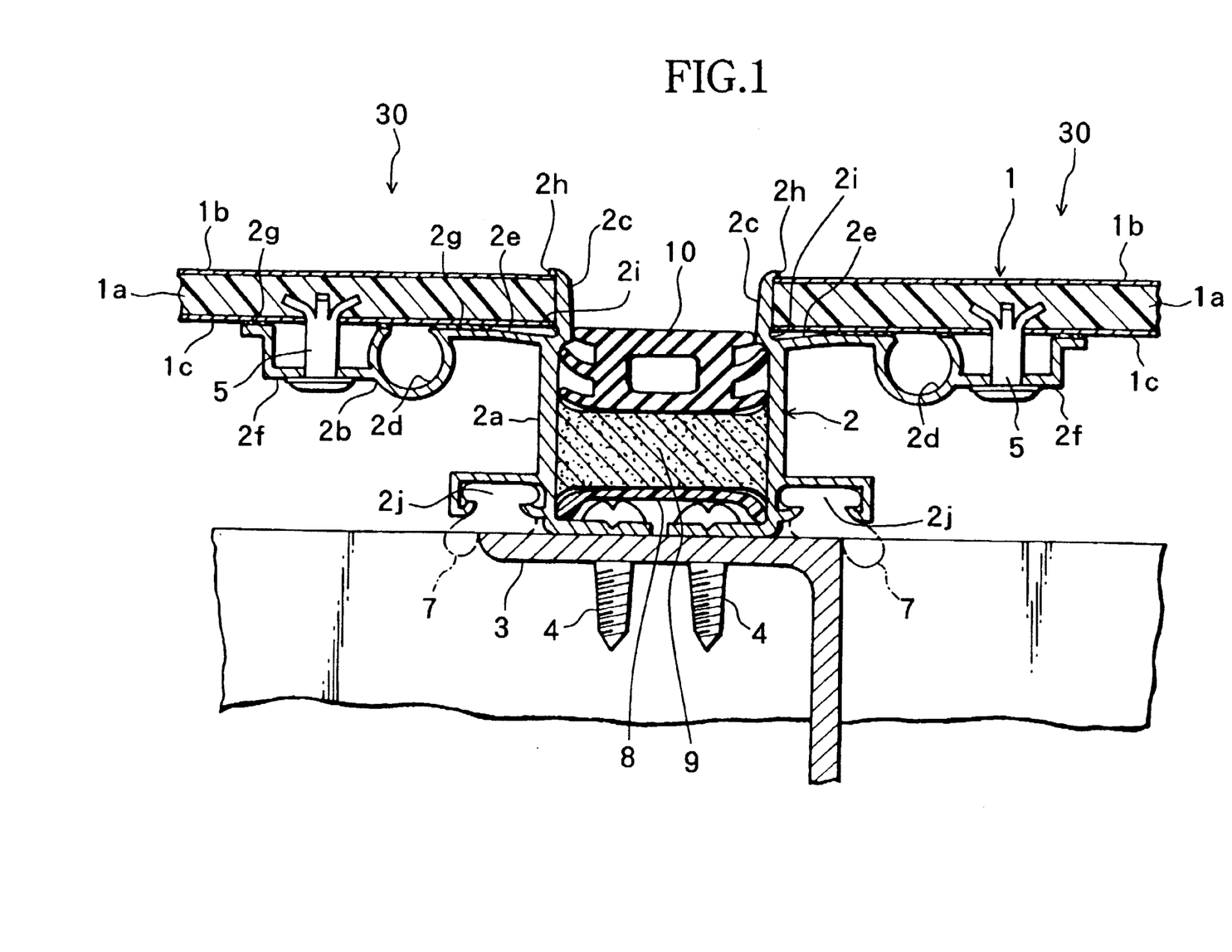
FIG. 1 is a section view partially illustrating a principal portion of a panel with holding frames according to an embodiment of the present invention.
Figure 2:
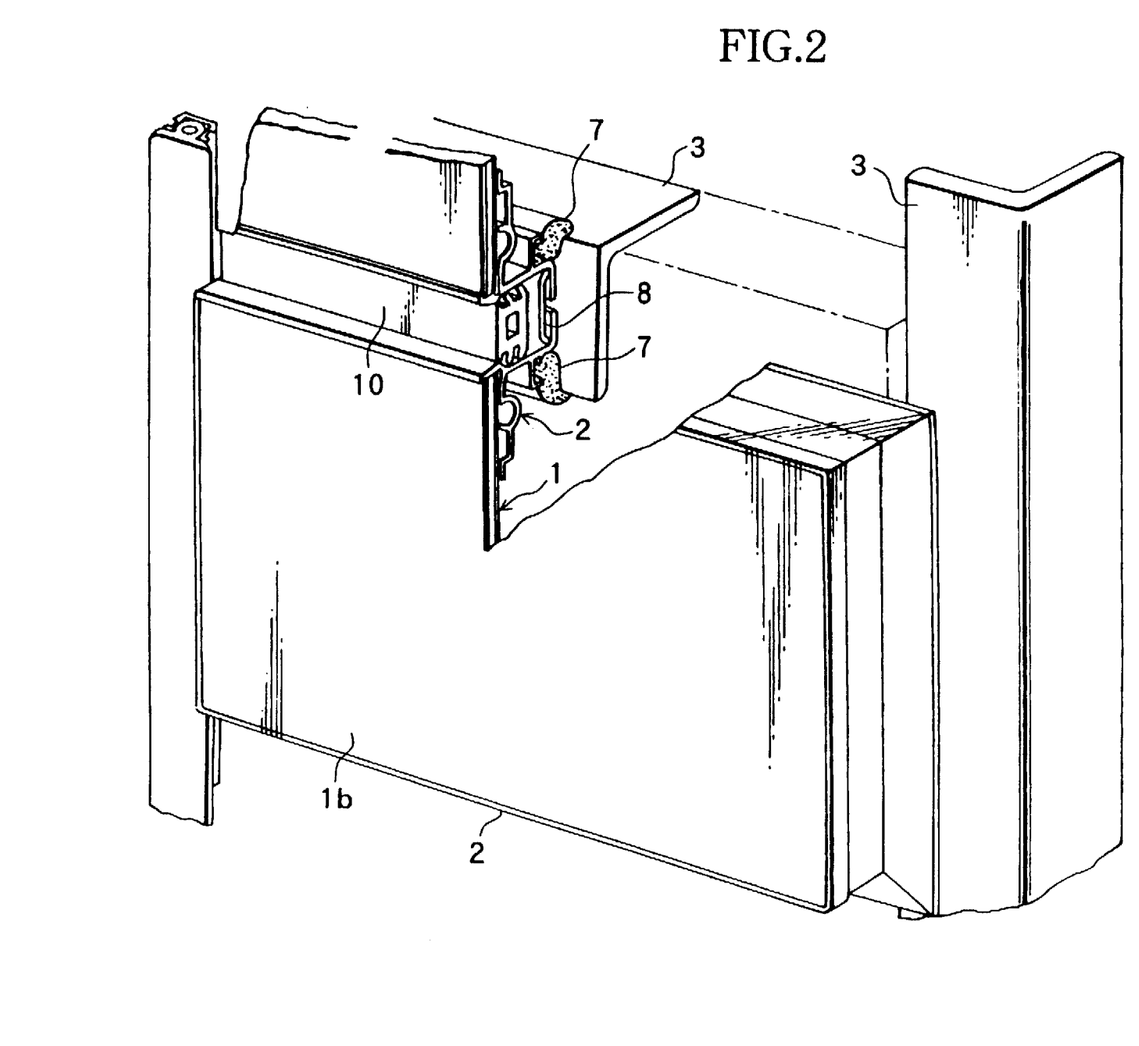
FIG. 2 is a perspective view illustrating the state that the panel with holding frames is attached to an architecture, partly in a section, according to the embodiment of the present invention.

FIGS. 1, 2, 3, 5 and 6 illustrate a panel with holding frames according to an embodiment of the present invention. A panel with holding frames 30 according to this embodiment, as shown in FIGS. 1 and 2, is structured by fixing holding frames 2 to respective sides of a square panel 1.

Figure 3:
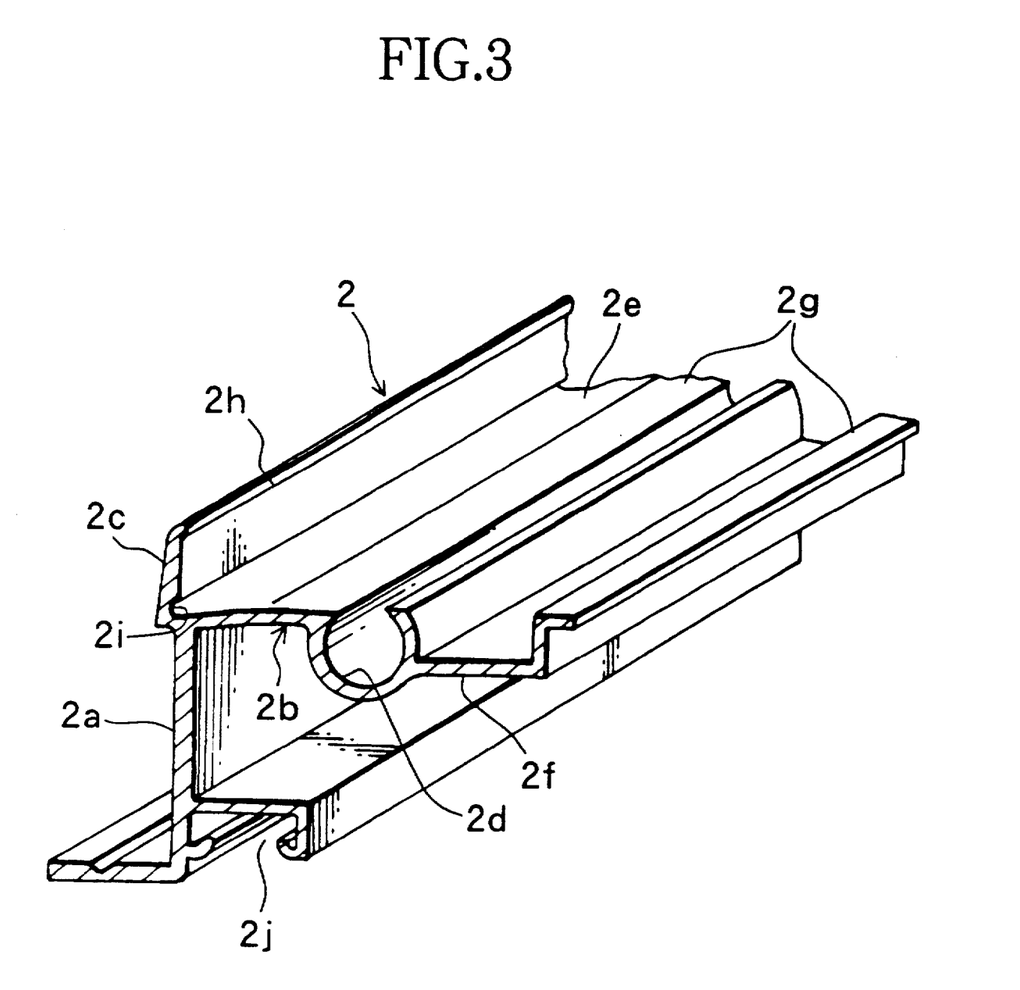
FIG. 3 is a perspective view illustrating a part of the holding frame included in the panel with holding frames according to the embodiment of the present invention.

Each holding frame 2 is roughly provided with a fitting leg portion 2a for attaching to an architecture, a support portion 2b abutted and fixed to the rear surface of the panel 1, a rim portion 2c for catching the peripheral edge of the panel 1, and a receiving portion 2d for engaging a corner block which connects the adjacent holding frames 2 each other. The support portion 2b of the holding frame 2 according to this embodiment is also provided with a relief portion 2e formed at the side of the rim portion 2c to make the insertion easy when the peripheral portion of the panel 1 is inserted into the catching rim portion 2c.

Now, the panel 1 is a composite plate which metal sheets 1b, 1c are laminated to both sides of a substrate 1a consisting of a non-metal material together. When the panel 1 is used as an external wall of an architecture, it is preferable that the panel 1 is formed in a rectangle, such as about length of 1200 mm, width of 2400 mm and thickness of 6 mm.

The substrate 1a of the panel 1 is formed from various kinds of synthetic resin or inorganic material such as ceramic, gypsum, asbestos cement calcium silicate and cement. When the substrate 1a is formed from the synthetic resin, heat reversible resin can be used as the synthetic resin, for example, polyolefine such as polyethylene and polypropylene, polyvinyl chloride, polyamide, polycarbonate, polystyrene, polyhydroxyether and vinyl acetate. The thermosetting resin can be also used. The substrate 1a is preferably formed in a solid plate of the thickness about 1–6 mm, and may be also formed in a hollow plate of a honeycomb construction.

The metal sheets 1b, 1c of the panel 1 are formed from metal such as aluminum, stainless, iron, copper, titanium, tin, nickel, various kinds of alloy, or the like. Then these metal sheets are formed into the thickness of about 0.1–1.0 mm, preferably, 0.3–0.5 mm.

The metal sheets 1b, 1c are sufficiently adhered to the substrate 1a and put together with an adhesive or the like. The adhesive is a graft polymer modified with unsaturated carboxylic acid or anhydride thereof, such as ethylene-acrylic acid copolymer, ethylene-vinyl acetate copolymer, ethylene-glycidyl acrylate copolymer, ethylene-maleic acid anhydride copolymer, polyolefine (polyethylene or the like).

The graft rate of the unsaturated carboxylic acid or the anhydride thereof concerning the above described graft modified polymer is usually set at $10^{-4}$–$10^{-3}$ WT %. The graft modified polymer is used as adhesive composite which hydro-carbon elastomer of 10–30 WT %, such as ethylene-propylene rubber, polyisobutylene is combined. The adhesive is usually laminated on the surface of the substrate 1a as adhesive films, and when the substrate 1a is synthetic resin, the adhesive may be combined in the synthetic resin. When the adhesive films are used, the thickness thereof is selected in the range of 10–100 μm.

Mitsubishi Chemical Corporation's product "ALPOLIC" (trade name) or the like is used as the above described composite panel to be the panel 1. This product is a composite plate which metal sheets (such as aluminum sheets) are adhered to the both sides of a thermoplastic resin plate (such as a polyethylene plate), and is used generally in the building material field and in various fields. This composite plate is manufactured by laminating metal sheets on the both sides of the melted-extruded synthetic resin plate and passing through rotation rolls so as to put together.

The holding frame 2, as shown in FIG. 3, is a metal formed material which the fixing leg portion 2a, the support portion 2b, the catching rim portion 2c, the receiving portion 2d and the relief portion 2e are extruded and formed integratedly. To protect electric corrosion, the holding frame 2 is usually formed from a metal material which has an electric potential similar to those of the metal sheets 1b, 1c of the panel 1. Then, four holding frames 2 are used for one panel 1 and fixed to four sides of the panel 1. Each end portion of each holding frame 2 is cut at an angle of 45° concerning the longitudinal direction and viewed from the front face, therefore, the holding frames 2 can be connected each other at a right angle.

The fixing leg portion 2a of the holding frame 2, as shown in FIGS. 1–3, is formed so as to position at an almost right angle to the surface or the rear surface of the panel 1, and the section of the free end portion thereof is formed in an L-shape bending toward the outside of the panel 1. The free end portion is attachably fixed with screws 4, 4 to an angle 3 for fitting, which is previously provided at a wall of the architecture.

The support portion 2b is bent from one end portion of the fixing leg portion 2a almost at a right angle to the fixing leg portion 2a, and extends along the rear surface of the panel 1. The bending portion is a joining portion of one end portion of the support portion 2b and one end portion of the leg portion 2a. The support portion 2b is provided with a shelf portion 2f in an sectional-U-shape for fixing to the panel 1 with the rivet 5 and a contact surface 2g adhered to the rear surface of the panel 1 with the adhesive. The support portion 2b is also provided with the receiving portion 2d in a groove-shape with an opening at a side facing the panel 1.

The receiving portion 2d is formed so as to have all length of the holding frame 2 in the longitudinal direction. Then, the described shelf portion 2f is formed so as to position at a center side of the panel 1 rather than the receiving portion 2d. The receiving portion 2d and the corner block 11 are provided so as to be rotatable relatively. As a structure, the corner block 11 bending in an L-shape consists of a pole member of which a section is circular, and the inside surface of the receiving portion 2d is a smooth surface so as to be rotatable about the corner block 11 while engaging closely with the corner block 11. Incidentally, the sectional shape of the corner block 11 is not limited when the corner block 11 can be closely engaged with the inside of the receiving portion 2d.

Figure 4:
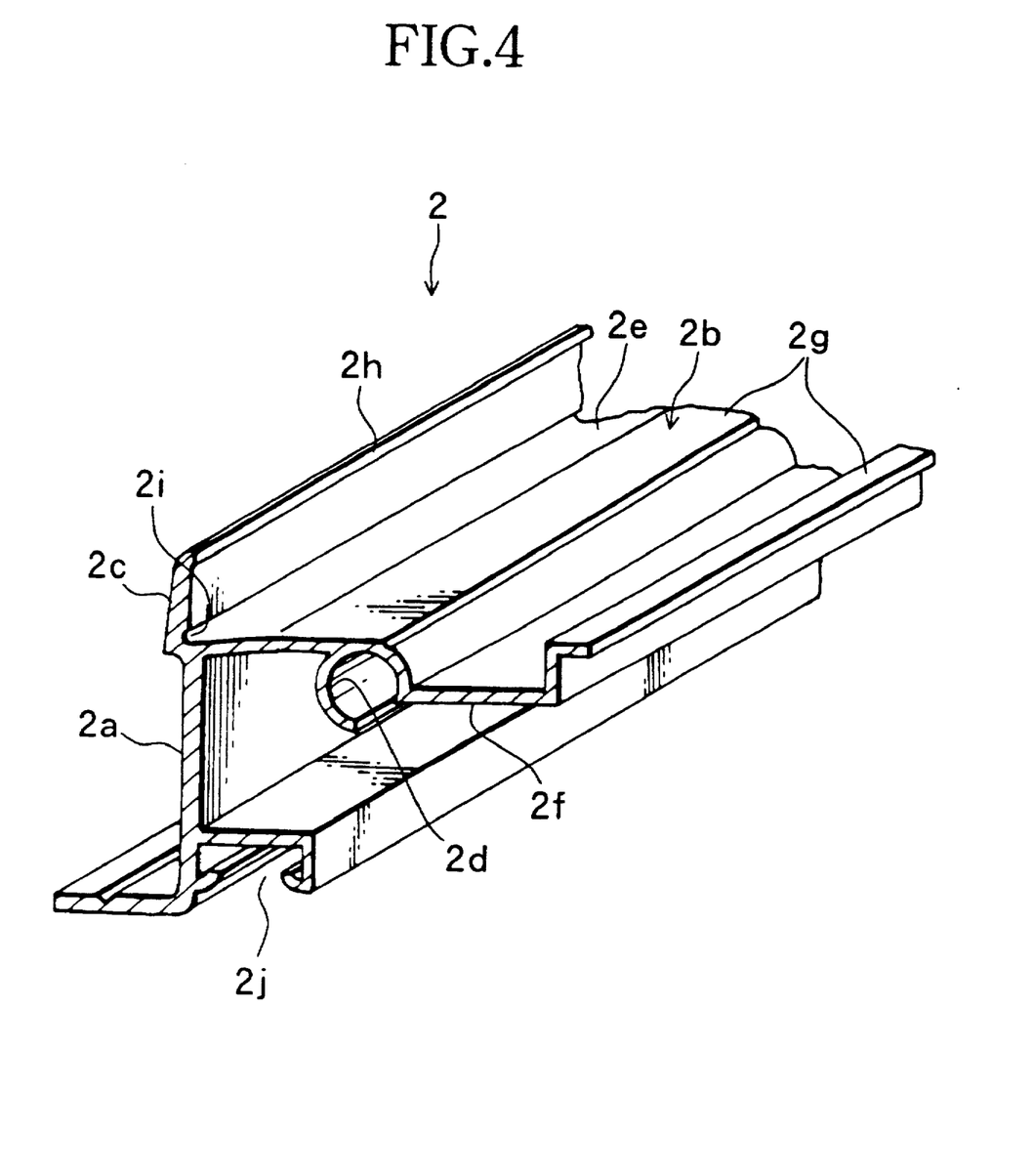
FIG. 4 is a perspective view illustrating partially another aspect of a holding frame included in the panel with holding frames of the present invention.
Figure 7:
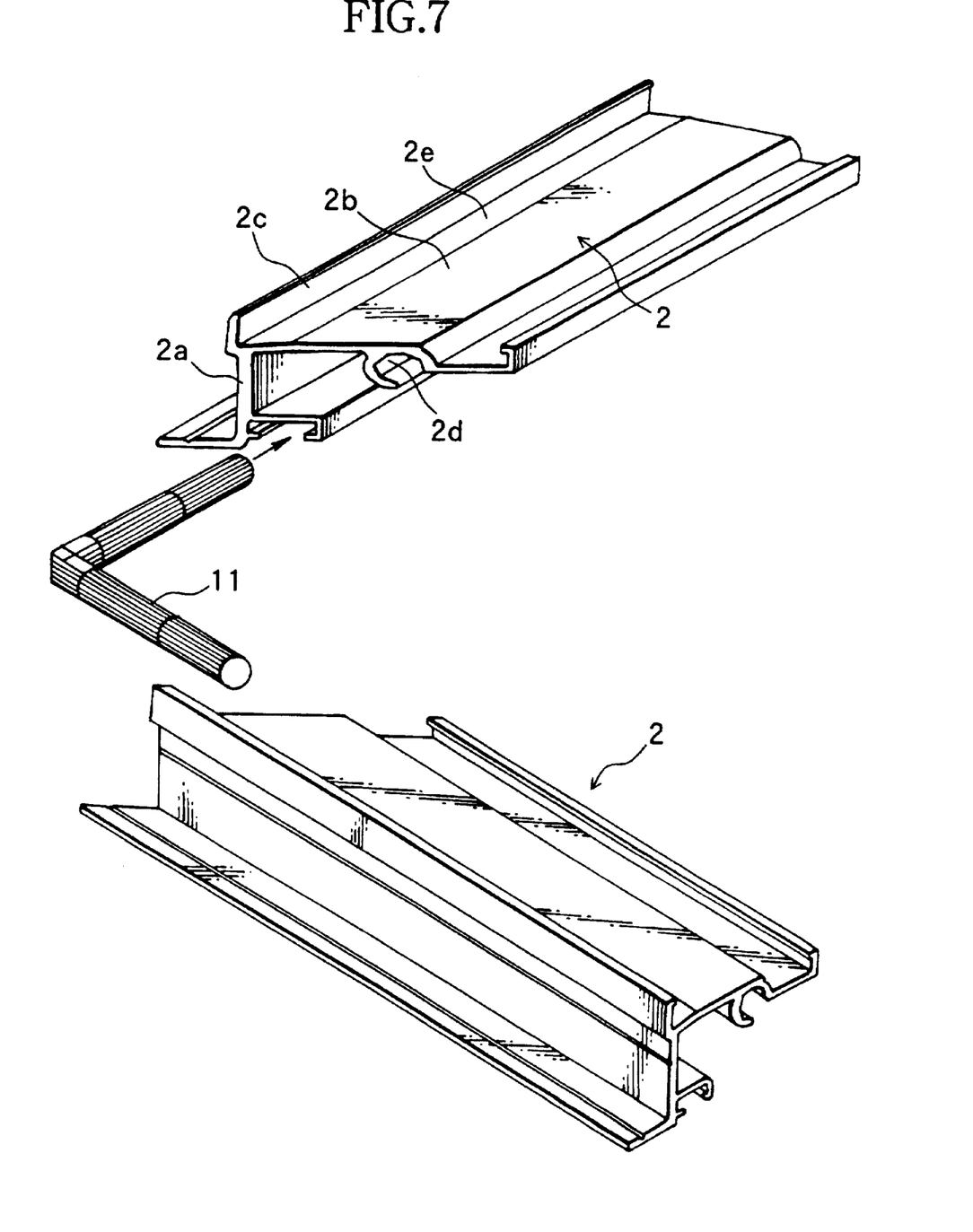
FIG. 7 is a perspective view illustrating a state that a corner block is inserted into a receiving groove portion in the holding frame of the embodiment shown in FIG. 4.

The receiving portion 2d, as apparent from holding frames of other embodiments in FIGS. 4 and 7, may be formed in a groove with an opening at the side facing the panel 1 or a groove with an opening at the opposite side. Those case are preferable, since it can be easily viewed from the rear surface side of the panel 1 that the corner block 11 is inserted. Needless to say, the receiving portion 2d may be a complete hole with no opening.

Further, it is necessary that the receiving portion 2d and corner block 11 are rotatable relatively as above described. That is, the structure thereof can be modified. For example, the receiving portion 2d may be formed in a hole of which a section is a square, and the corner block of which a section is circular may be inserted thereto. Further, the receiving portion 2d may be formed in a hole of which a section is a circle or a circular shape, and the corner block of which a section is a square may be inserted thereto, so that they can rotate relatively. Needless to say, they may be formed conversely.

The catching rim portion 2c is provided with a wall portion extending from one end portion of the fixing leg portion 2a to the surface of the panel 1 along the side of the panel 1 and a engaging claw 2h formed at the top portion of the wall portion and projecting slightly along the surface of the panel 1, and the peripheral edge of the panel 1 is caught with the catching rim portion 2c. Thus, one end portion of the catching rim portion 2c also joins with one end portion of the leg portion 2a and one end portion of the support portion 2b. The joining portion of this three members is defined as a base portion of the catching rim portion 2c.

Moreover, in the panel with holding frames 30 according to this embodiment, as above described, the relief portion 2e for the panel 1 is formed at a side approaching to the catching rim portion 2c of the support portion 2b, namely, at the base side of the rim portion 2c. The relief portion 2e is a tilting surface so as to lower the base side of the rim portion 2c than the contact surface 2g. Usually, though it is preferable that the relief portion 2e is a tilting surface, the relief portion 2e may be formed in concave to achieve the object thereof. The object is that, when the holding frames 2 are fitted to the panel 1, it is made possible to receive the peripheral edge of the panel 1 with the catching rim portion 2c, namely, a reverse-L-shaped space portion partitioned with the base portion, the wall portion and the engaging claw 2h smoothly without damaging the edge portion of the metal sheet at the surface side of the panel 1 by the engaging claw.

Concerning the relief portion 2e, the interval between the base portion of the rim portion 2c to be the lowest position of the tilting surface as to the contact surface 2g and the engaging claw 2h is designed so as to form a little space between the surface of the panel 1 and the engaging claw 2h when the peripheral rear surface portion of the panel 1 is put on the tilting surface and contact therewith. That is, the height between the base portion of the rim portion 2c and the engaging claw 2h is designed so as to be slightly larger than the thickness of the peripheral portion of the panel 1.

A recess groove 2i is continuously formed at the base portion of the rim portion 2c in the longitudinal direction.

and the rim portion 2c and the relief portion 2e formed in the support portion 2b can be connected through the recess groove 2i. That is an advantage, since the excess of the adhesive, which is applied when it is needed for temporarily fixing the holding frame 2 to the rear surface of the panel 1, can be got out.

Additionally, as shown in FIG. 1, it is preferable that a gasket fitting groove 2j is formed integratedly with the holding frame 2. The gasket fitting groove 2j is formed to extend from the fixing leg portion 2a at the opposite positions of the rear surface so as to be hidden by the panel 1, and opens at the fixing side of the angle 3. With this arrangement, a gasket 7 inserted into and held with the gasket fitting groove 2j adheres to the fitting surface of the angle 3, whereby the gasket 7 prevents rainwater, which enters from a slight space between the free end portion of the fixing leg portion 2a bending toward the outside of the panel 1 and the fixing surface of the angle 3, from entering the inside of the panel 30 with holding frames.

Next, an explanation will be given of the assembling procedure of the panel with holding frames according to this embodiment. For fitting each holding frame 2 to the periphery of the panel 1, previously the corner block is inserted into the receiving portion 2d and each holding frame 2 is assembled temporarily in a frame-shape slightly larger than the panel 1. At that time, it is preferable that adhesive or sticky material is applied to the contact surface 2g of each holding frame 2 and the inside surface of the rim portion 2c.

Figure 5:
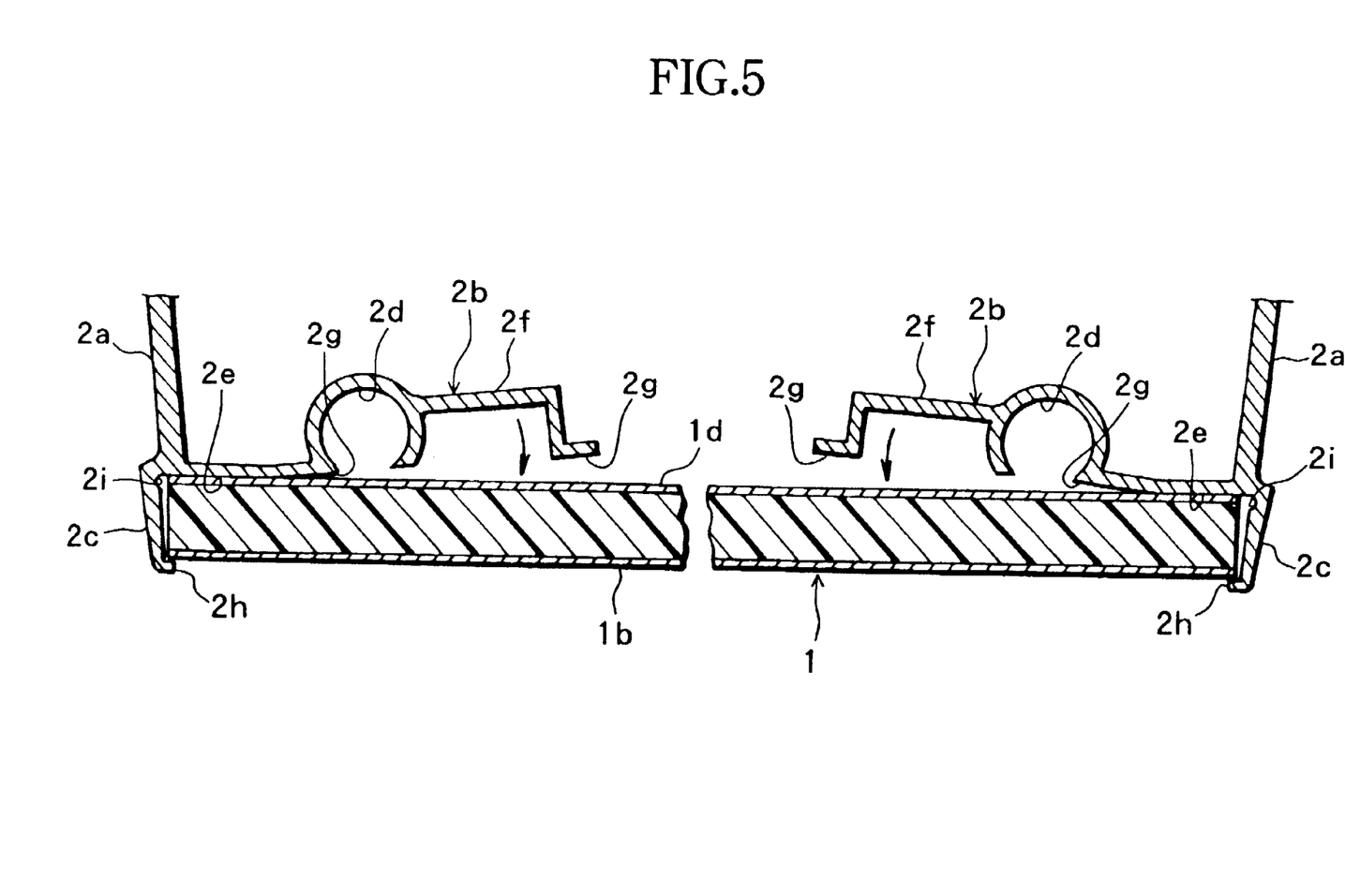
FIG. 5 is a section view illustrating a state that holding frames fitted to a panel concerning the panel with holding frames according to the first embodiment of the embodiment shown in FIG. 1.

On the contrary, the rear surface of the panel 1 is directed upwardly, and the panel 1 is positioned on a working bench which is smaller than the surface of the panel 1 in a manner that the peripheral portion of the panel 1 gets out from the surface of the working bench. Then, the described holding-frame temporary-assembled member is directed in a manner that the contact surface 2g of the support portion 2b opposites to the rear surface of the panel 1 and is covered on the periphery of the panel 1. At that time, as shown in FIG. 5, each holding frame 2 rotates about the corner block 11 in a manner that relief portion 2e joins with the peripheral rear surface portion of the panel 1 and the engaging claw 2h of the rim portion 2c faces to the surface side of the panel 1. That is, the holding-frame temporary-assembled member is ready in the slightly tilting state in a manner that the tilting surface of the relief portion 2e in each support portion 2b becomes a part of a virtual plane in parallel with the rear surface of the panel 1.

As the result, since the height between the engaging claw 2h and the relief portion 2e just under it is larger than the thickness of the peripheral portion of the panel 1 as described above, the panel 1 is received in the space surrounded with the engaging claw 2h and the wall portion, namely, the rim portion 2c smoothly. Therefore, there is no case that the engaging claw 2h is caught by the edge portion of the metal sheet to form the surface of the panel 1 to thereby damage the metal sheet.

Next, as shown in FIG. 5, the peripheral rear surface portion of the panel 1 is put on the relief portion 2e of each holding frame 2, and the peripheral rear surface portion pushes each holding frame 2 to the side surface of the panel 1 while being received in the rim portion 2c loosely. The pushing work is that two adjacent holding frames 2 are made contact with an L-shaped square (not shown) so as to be supported and the other two adjacent holding frames 2 are pushed into with a clamp or a cylinder apparatus (not shown). Then, each holding frames 2 rotate as shown with an arrow in FIG. 5 while rotating relatively about the corner block 11. With this arrangement, the contact surface 2g of the holding frame 2 joins with the rear surface of the panel 1, and the rim portion 2c catches the peripheral portion of the panel 1 so as to fit thereto comparatively closely and the engaging claw 2h is positioned on the surface of the panel 1 so as to fix to the panel 1 (see FIG. 6).

Figure 6:
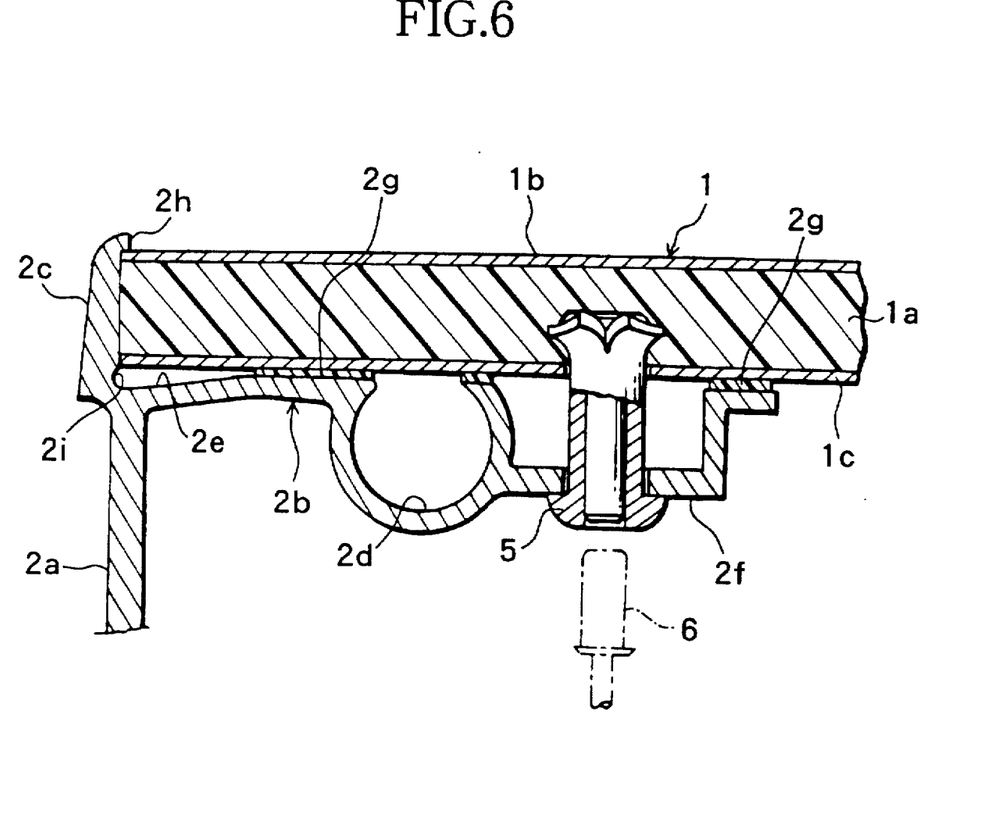
FIG. 6 is a section view illustrating a sectional and enlarged portion of the panel with holding frames to show a state that the holding frame fixed to the panel shown in FIG. 5 is fixed to the panel with a rivet.

Thereafter, the support portion 2b of each holding frame 2 is fixed tightly to the panel 1 by knocking the rivet 5 into the substrate 1a of the panel 1 from the shelf portion 2f, as shown in FIG. 6. With this, the work for fitting the holding frame 2 to the panel 1 finishes.

Figure 8:
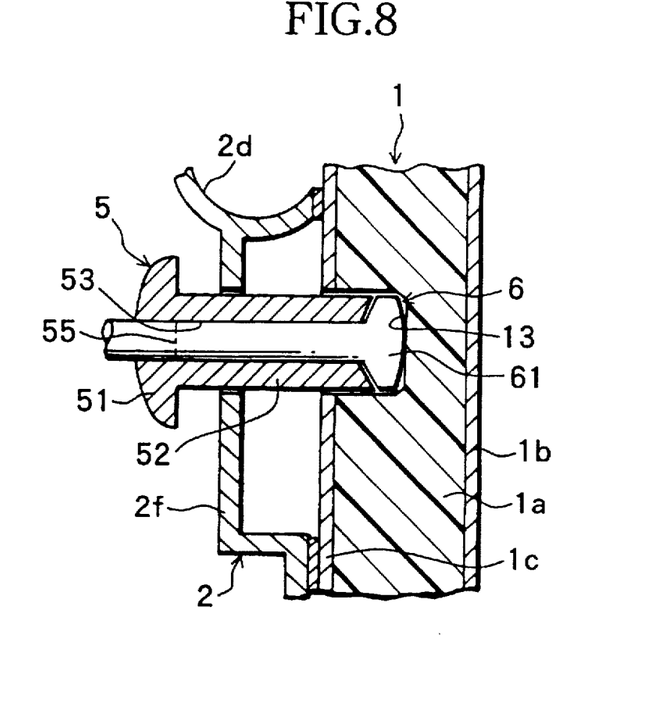
FIG. 8 is a partial section view illustrating an initial stage that the support portion of the holding frame is fixed to the panel with the rivet.
Figure 9:
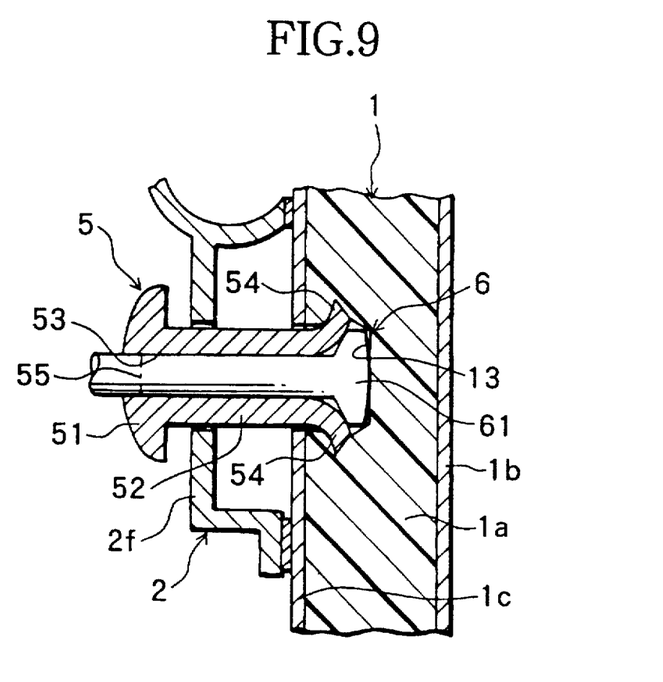
FIG. 9 is a partial section view illustrating a second stage that a mandrel of the rivet is started to be drawn from the state shown in FIG. 8.

The brief explanation will be given of the knocking procedure of the rivet 5 with reference to FIGS. 8 and 9. The rivet 5 is called a blind rivet, and a mandrel penetration aperture 53 is formed in the rivet 5 from a head 51 to a shank 52. Plural cuttings are arranged at the top of the shank 52 along the axial line. A mandrel 6 passes through the penetration aperture 53 and projects from the rivet shank 52. A mandrel head 61 is formed, of which the outside diameter is larger than the inside diameter of the passing through hole 53, is formed at the end portion of the mandrel 6, which projects from the passing through hole 53.

When the rivet 5 is used, the rivet hole 13 is previously formed in the panel 1. The rivet hole 13 is formed to have a depth which the rivet 5 achieves to the substrate 1a from the metal sheet 1c but passes through the metal sheet 1b. Thus, the rivet 5 is inserted into the rivet hole 13 formed in the panel 1 through the hole of the shelf portion 2f, and when the top thereof is contact with the bottom of the rivet hole 13, there is a space between the surface of the shelf portion 2f and the bottom of the rivet head 51.

Then, while the rivet shank 52 is pushed to the side of the panel 1 by applying pressure to the head 51 of the rivet 5, a drawing force is given to the mandrel 6 projecting from the head 51 by grasping it with a tool. As the results, the top of the shank 52 is split plurally along the cuttings by a spreading force with the mandrel head 61 and is spread toward the outside of the diameter direction, whereby a flange 54 is formed. The flange 54 digs into the peripheral wall of the rivet hole 13 formed in the substrate 1a in accordance with the movement of the shank 52 to the side of the panel 1 until the head 51 becomes contact with the surface of the shelf portion 2f.

At that time, since the spread at the top of the shank 52 stops, the mandrel 6 applying the draw force stops the movement relative to the shank 52. Thus, the draw force applied to the mandrel 6 is concentrated at a breakable portion 55 formed in the mandrel 6 positioned in the shank 52. As the results, the mandrel 6, as shown in FIG. 6, is broken at the breakable portion 55. As above described, the rivet 5 is knocked into the panel 1 through the hole of the shelf portion 2f, and the support portion 2b of the holding frame 2 is fixed to the rear surface of the panel 1 tightly.

At that time, the excess of the adhesive or the sticky material applied to the contact surface 2g of the holding frame 2 and the inside surface of the rim portion 2c lays in the recess groove 2i and on the relief portion 2e without leaking the excess to the surface side of the panel 1, so that the panel 30 with holding frame can be finished very well.

Moreover, as to the adhesive or the sticky material applied to the contact surface 2g of the holding frame 2 and the inside surface of the rim portion 2c, the sticky material includes the usage of natural rubber or synthetic rubber as a base material, or such as elastomeric adhesive using thermoplastic elastomer such as styrene-butadiene block copolymer and styrene-isoprene copolymer, acrylic adhesive which a major constituent is acrylic ester copolymer, silicone adhesive which a major constituent is silicone elastomer and silicon resin, vinyl adhesive which vinyl ether polymer is used as the material.

Further, as the adhesive, thermoplastic resin adhesive, elastomeric adhesive or the like is used. The samples of thermoplastic resin adhesive are vinyl acetate resin, vinyl chloride resin, ethylene-vinyl acetate resin, acyclic resin and cellulose, and those may be used in all of the solvent volatile type, the chemical reaction type or the heat fusion type. As the elastomeric adhesive, various kinds of adhesive using chloroprene rubber, nitrile rubber, styrene-butadiene block copolymer, and those may be used in either the solvent volatile type or the heat fusion type.

As above described, the panels with holding frames 30 according to the present invention, in which each holding frame 2 is fitted to the periphery of the panel 1, are arranged in cross-cut in large numbers and fixed to the wall surface of the architecture. That is, each panel with holding frames 30, as shown FIGS. 1 and 2, is set by fixing the fixing leg portion 2a of the holding frame 2 to a bed angle (bed steel frame) arranged at the body surface side of the architecture through the screws 4, 4.

In that case, the gasket 7 for stopping water, which is fitted to the gasket fitting groove 2i of the holding frame 2, adheres closely to the bed angle 3. Then, as countermeasures for water stopping and appearances improvement, joints between the respective panels 30 with holding frames, which are arranged in cross-cut and fixed, are filled with backup material 8, backup material 9 and gaskets 10 sequentially.

Figure 10:
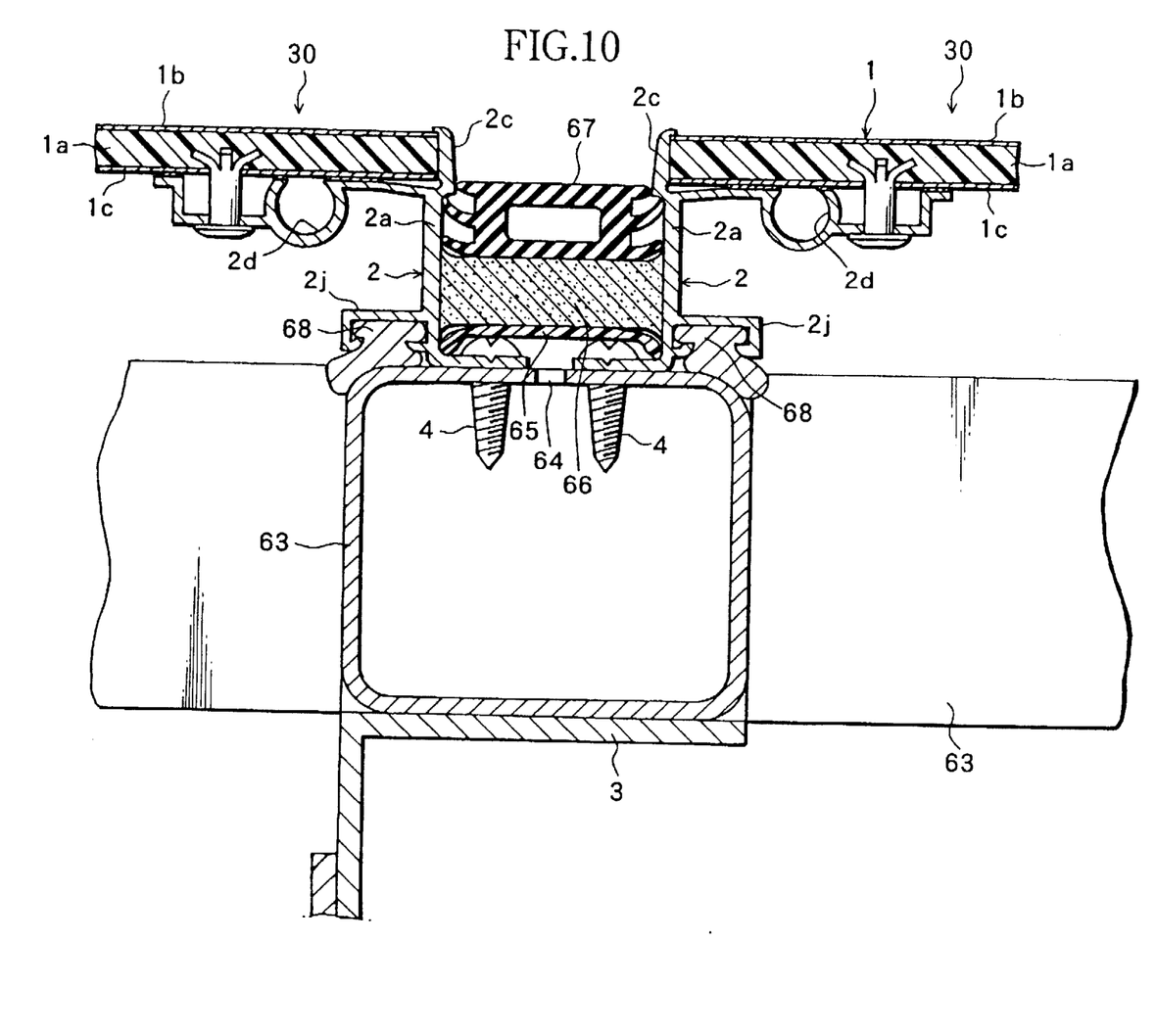

FIG. 10 shows another fitting structure which the panel with holding frames 30 according to this embodiment is fitted to bed material (bed steel frame) arranged at the body surface side of the architecture. In the fitting structure shown in FIG. 10, a lot of square pipes 63 are arranged in the longitudinal and horizonal directions as the bet steel frame. A hole 64 is formed on the surfaces of the square pipes 63 in longitudinal and horizonal directions about the center portion of the width direction thereof, and a lot of the holes 64 are formed along the longitudinal directions of the respective square pipes 63 at predetermined intervals. Each hole 64 leads to the inside space of the square pipe 63.

Two adjacent panels 30 with holding frames, as shown in FIG. 10, are arranged in a manner that the respective free end portions of the fixing leg portion 2a in the respective holding frames 2 are laid on the surfaces by halves in the width direction of the respective pipes 63 of the common horizonal or longitudinal direction, and are tightly fixed to each pipe 63 by screwing the screws 4 at the predetermined intervals.

When the panels with holding frames 30 are fixed to each pipe 63 like this, the interval portion between the adjacent panels with holding frames 30 becomes the joint portion as usual, and the hole 64 formed about the center portion in the width direction of the each pipe 63 in the horizonal or longitudinal direction opens toward the joint portion, so that the joint portion leads to the inside of each square pipe 63 through the hole 64.

Additionally, a sealant is arranged at the joint portion so as to improve the appearances and not so as to expose the hole 64 of the square pipe surface to the air directly. That is, when the hole 64 of the square pipe surface is exposed to the air directly, rain and wind insert into the square pipe 63 through the hole 64 to thereby raise the air pressure of the inside, so that there is a possibility in that rain water enters the detail in the square pipe 63 by the strong flow of the air.

Therefore, the sealant is arranged to cover the hole 64. With this point, though a joint gasket may be only used as the sealant, taking that the joint portion is exposed by wind, rain, direct sunshine and the like into consideration, from a point of durability, it is preferable that a primary waterproof function is applied by arranging a backup member 64, a waterproof sealant 66 thereon and the like. In some cases, a joint gasket 67 may be also put on the waterproof sealant 66.

As above described, the fixing leg portion 2a of the holding frame 2 in the panel with holding frames 30 is fixed to the surface of the square pipe 63 and the hole 64 penetrating the joint portion and the inside of the square pipe is formed on the surface of the square pipe 63 between the adjacent panels with holding frames 30 is formed, therefore, though rain water gets to the lower side of the sealant 66 in a case of peeling the sealants 66 or another like case, it can be prevented that rain water or the like flows into the square pipe 63 completely and enters the body of the architecture.

That is, generally, rain water or the like scatters with the flow of the air, therefore, when the flow of the air to the inside of the square pipe 63 is formed positively, the rain water flows into the square pipe 63 easily. As to the rain water or the like entering the inside of the square pipe 63, since the sectional area of the square pipe 63 is larger than the area of the hole 64, the pressure of the air which flows into the square pipe 63 is reduced and weaken instantaneously. Thus, the rain water flows in accordance with only the self-weight through the inside of the square pipe 63, and finally flows out to drain equipment and the like (not shown) connected with the square pipe.

Provided that the enter-proof method is used to prevent rain water and the like from entering the architecture body with the attaching structure like this, it is necessary that the adhesion between the fixing leg portion 2a of the holding frame 2 in the panel with holding frames 30 and the surface of the square pipe 63 is raised to be airtight or the inside of the panel with holding frames 30 is made airtight by fitting an airtight member 68 as a secondary waterproof to the gasket fitting groove 2j provided at the inside of the panel 30 with holding frames so as to be contact with the square pipe 63 completely. This arrangement shuts the passage of the air to the inside of the panel with holding frames 30 surrounded with the fixing leg portion 2a of the holding frame 2, therefore, though rain water gets to the rear side of the sealant 66 by peeling or cracking the sealant 66, the rain water only flows to the inside through the hole 64 formed on the surface of the square pipe 63.

As above explained, according to the panel with holding frames of the present invention, a peripheral portion of the panel of a support portion included in a holding frame and extending along a rear surface of the panel is formed and a relief portion is formed in the vicinity of a rim portion for catching, whereby the rim portion can receive the peripheral portion of the panel very smoothly and the holding frame can be fixed to the panel easily without damaging the edge portion of the metal sheet on the surface of the panel.

According to the panel with holding frames of the present invention, the holding frame is provided with a leg portion, a support portion and a rim portion and is formed in a manner that respective end portions are jointed integratedly, therefore, when that is formed from metal such as aluminum, a form for extrusion molding can be used, so that it can be manufactured easily.

Further, according to the panel with holding frames of the present invention, a rim portion for catching the periphery of the panel is provided with a wall portion opposite to the side of the panel and a engaging claw projecting from the surface of the panel, therefore, the periphery of the panel can be held securely and there is no problem of dropping.

Moreover, according to the panel with holding frames of the present invention, a relief portion formed at the support portion is a tilting surface. Therefore, when the panel is relatively arranged in an assembled member which plural holding frames are assembled temporarily in a frame, the peripheral portion of the panel is put on the tilting surface arranged as a part of a horizonal surface, whereby the panel can be positioned stably.

Furthermore, according to the panel with holding frames of the present invention, the relief portion formed at the support portion and the rim portion are connected through a recess groove formed at the base portion of the rim portion, therefore, excess of the adhesive applied in accordance with the necessity for temporary fitting of the holding frames to the rear surface of the panel can be got away.

Additionally, according to the panel with holding frames of the present invention, a receiving portion for engaging a corner block to connect adjacent holding frames each other is formed, and the receiving portion and the corner block fitted thereto are formed so as to be rotatable relatively. Therefore, when the respective holding frames, which are assembled temporarily one another with the corner block, are pushed to the side of the panel combined with the existence of the relief portions formed at the respective support portions and are fitted to the panel, the respective holding frames can be rotated relatively to the corner blocks. As the results, the holding frames can be fitted to the peripheral portion of the panel without damaging the peripheral surface side of the panel with good workability and at high accuracy.

Still more, according to the panel with holding frames of the present invention, the panel is formed by adhering metal sheets to both surfaces of a substrate made from inorganic material. Therefore, since the panel is light and has strength, and particularly, it is very easy to fit the panel when it is used as an external wall panel of an architecture, not only the cost for fitting becomes inexpensive but also the appearances become very fine, whereby the value can be highly estimated as a modern architecture.

This invention being thus described, it will be obvious that same may be varied in various ways. Such variations are not to be regarded as departure from the spirit and scope of the invention, and all such modifications would be obvious for one skilled in the art intended to be included within the scope of the following claims.

What is claimed is:

1. In a panel with holding frames structured by fitting a holding frame to sides of a square panel;
    said holding frame comprising a leg portion, a support portion, and a rim portion, said leg portion being connected to an element of an architecture, said support portion being fixed to a rear surface of said panel in contact, and said rim portion catching a periphery of said panel; and
    said support portion having a relief portion receiving the periphery of said panel with said rim portion smoothly on the support portion,
    wherein said panel having corner blocks, each of said corner blocks being engaged with a receiving portion formed in the holding frame thereby connecting two of said holding frames adjacent to each other, and wherein said holding frames being rotatable relative to each of said corner blocks.

2. A panel with holding frames according to claim 1, wherein said receiving portion is a groove portion of which a section is circular.

3. A panel with holding frames according to claim 2, wherein said groove portion of which a section is circular is provided with an opening portion which opens in direct opposition to the rear surface of said panel.

4. A panel with holding frames according to claim 3, wherein when said holding frame is fitted to each said side portion of said panel, four said holding frames are connected one to another and assembled temporarily in a frame with plural said corner blocks, wherein each of said corner blocks has end portions, of which each of said end portions is inserted into said receiving portion of said adjacent holding frames thereby forming a holding frame temporary assembled body, and wherein said holding frame temporary assembled body is kept in a state that the holding frame temporary assembled body is tilted slightly in a manner that a tilting surface of said relief portion at said support portion becomes a part of a virtual plane in parallel with the rear surface of said panel, said panel is positioned so as to put a peripheral rear surface portion thereof on the tilting surface of said relief portion to provide said panel in said holding frame temporary assembled body in the state, and finally said support portion is rotated toward the rear surface of said panel by pushing said four holding frames to sides of said panel almost at a same time so as to put the peripheral portion of said panel with said rim portion accurately.

5. In a panel with holding frames structured by fitting a holding frame to sides of a square panel;
    said holding frame comprising a leg portion, a support portion, and a rim portion, said leg portion being connected to an element of an architecture, said support portion being fixed to a rear surface of said panel in contact, and said rim portion catching a periphery of said panel; and
    said support portion having a relief portion receiving the periphery of said panel with said rim portion smoothly on the support portion,
    wherein said support portion is fixed to said panel with a rivet, and a top of said rivet stops at an inside of said panel not to pass through a front surface of said panel.

6. A panel with holding frames according to claim 5, wherein said rim portion catching the periphery of said panel being comprised with a wall portion extending from said support portion to a front surface of said panel along a side surface of said panel and an engaging claw formed at a head portion of the wall portion and projecting slightly along the front surface of said panel, and the engaging claw is hooked to the periphery at a side of the front surface of said panel, wherein the wall portion includes a portion which is joined to the support portion which is a base portion of the rim portion.

7. A panel with holding frames according to claim 6, wherein said relief portion formed at said support portion is a tilting surface going down to said base portion of said rim portion, and an interval between a lowest position of the tilting surface and said engaging claw is larger than a thickness of said panel.

8. A panel with holding frames according to claim 7, wherein said holding frame having a recess groove, said recess groove being formed at said base portion of the rim portion.

9. A panel with holding frames according to claim 5, wherein a portion of said support portion to fix to said panel with said rivet is a shelf portion having an interval from the rear surface of said panel.

10. A panel with holding frames according to claim 9, wherein the top portion of said rivet splits and opens in said panel, and said support portion is pushed to said panel by said top portion of said rivet which splits and opens and a rivet head over said shelf portion so as to be fixed to said panel.

11. A panel with holding frames according to claim 9, wherein said holding frame further comprises a receiving portion for engaging a corner block, and wherein said shelf portion is formed closer to a center of said panel than said receiving portion.

12. A panel with holding frames according to claim 11, wherein said panel is a laminated member further comprising thin metal sheets laminated to both surfaces of a plate member, wherein said plate member consisting of inorganic material selected from the group consisting of ceramic, gypsum, asbestos cement calcium silicate and cement or various synthetic resins.

13. A panel with holding frames according to claim 12, wherein said metal sheets to form said panel are formed from one of aluminum, stainless, iron, copper, titanium, tin and nickel, and various kinds of alloy.

14. A panel with holding frames according to claim 13, wherein said holding frame is formed from one of aluminum, stainless, iron, copper, titanium, tin and nickel, and various kinds of alloy.

15. A panel with holding frames according to claim 14, wherein said panel with holding frames is used as an external wall panel.

* * * * *